F. M. WARREN.
STEAM-TANKS FOR COOKING FISH AND MEAT IN CANS.
No. 189,407. Patented April 10, 1877.
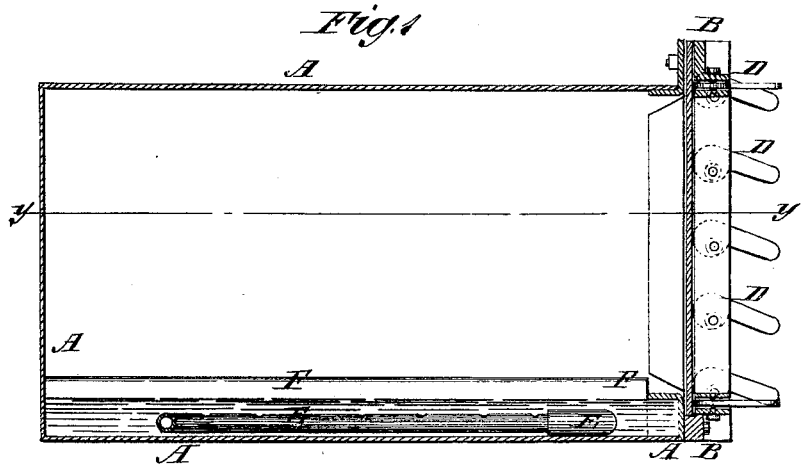
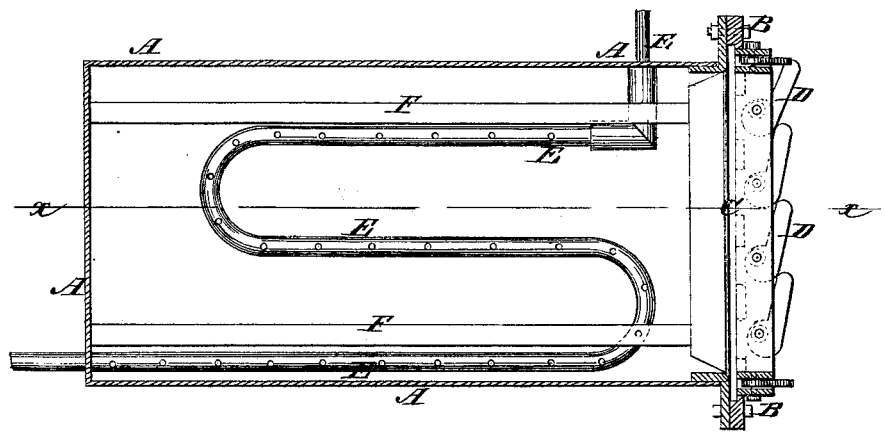
WITNESSES:
INVENTOR:
F. M. Warren
BY
ATTORNEYS.

UNITED STATES PATENT OFFICE.

FRANCIS M. WARREN, OF PORTLAND, OREGON.

IMPROVEMENT IN STEAM-TANKS FOR COOKING FISH AND MEAT IN CANS.

Specification forming part of Letters Patent No. 189,407, dated April 10, 1877; application filed October 14, 1876.

*To all whom it may concern:*

Be it known that I, FRANCIS M. WARREN, of Portland, in the county of Multnomah and State of Oregon, have invented a new and useful Improvement in Steam-Tank for Cooking Fish and Meat in Cans, of which the following is a specification:

Figure 1 is a vertical longitudinal section of my improved steam-tank, taken through the line $x\ x$, Fig. 2. Fig. 2 is a horizontal longitudinal section of the same, taken through the line $y\ y$, Fig. 1.

Similar letters of reference indicate corresponding parts.

The object of this invention is to furnish an improved apparatus for cooking salmon and other fish and meats in cans by means of steam, which shall be so constructed as to do the work in less time, with less labor, and consequently at less expense, than when the fish and meats are cooked in the usual way.

The invention consists in the steam-tank, provided with the rim around its open end, the sliding door, the cams, the perforated steam-pipe, and the track, as hereinafter fully described.

A represents the body of the tank, which is made of boiler-iron, of rectangular form, and of any desired capacity. One end of the tank is left open, and around its edge is formed a rim, B, which may be made of angle-irons bolted together, and bolted or riveted to the tank A, and which is so formed as to have a groove to receive the edges of the door C, and to it are pivoted a number of cams, D, which, when the door C is in place, may be turned to press the said door to its seat steam-tight. In the bottom of the tank A is coiled a steam-pipe, E, which is perforated with numerous small holes, to allow the steam to escape into the said tank freely. To the bottom of the tank is attached a track, F, for the hand-cars, upon which the cans are piled, to be run in and out upon. The track F should be a little higher than the pipe E.

In using the tank, enough water should be put into the said tank A to cover the pipe E, but not the track F, so that the steam must rise through water in escaping from the pipe E, to distribute the heat equally through the tank.

The tank A should be provided with a gage, to indicate the pressure of the steam, with thermometers to indicate the heat, and with a safety-valve, to guard against explosions.

Having thus described my invention, I claim as new and desire to secure by Letters Patent—

The steam-tank A, provided with the rim B around its open end, the sliding door C, the cams D, the perforated steam-pipe E, and the track F, substantially as herein shown and described.

FRANCIS M. WARREN.

Witnesses:
WALT. G. SPARROW,
FRANK M. WARREN.